(12) United States Patent
Noda

(10) Patent No.: US 9,915,516 B2
(45) Date of Patent: Mar. 13, 2018

(54) METHOD FOR CONTROLLING SHAPE MEASURING APPARATUS

(71) Applicant: MITUTOYO CORPORATION, Kanagawa (JP)

(72) Inventor: Takashi Noda, Tochigi (JP)

(73) Assignee: MITUTOYO CORPORATION, Kanagawa (JP)

(*) Notice: Subject to any disclaimer, the term of this patent is extended or adjusted under 35 U.S.C. 154(b) by 149 days.

(21) Appl. No.: 15/141,145

(22) Filed: Apr. 28, 2016

(65) Prior Publication Data

US 2016/0341533 A1   Nov. 24, 2016

(30) Foreign Application Priority Data

May 22, 2015  (JP) ................. 2015-104422

(51) Int. Cl.
  *G01B 5/008* (2006.01)
  *G05B 19/401* (2006.01)

(52) U.S. Cl.
  CPC .......... *G01B 5/008* (2013.01); *G05B 19/401* (2013.01); *G05B 2219/35066* (2013.01); *G05B 2219/37193* (2013.01); *G05B 2219/37205* (2013.01); *G05B 2219/37206* (2013.01); *G05B 2219/37443* (2013.01); *G05B 2219/37449* (2013.01); *G05B 2219/50063* (2013.01); *Y02P 90/265* (2015.11)

(58) Field of Classification Search
  CPC .................................................... G01B 5/008
  USPC ................................................ 33/502, 503
  See application file for complete search history.

(56) References Cited

U.S. PATENT DOCUMENTS

| 6,434,846 B1 * | 8/2002 | McMurtry ............. B82Y 15/00 33/502 |
| 7,643,963 B2 | 1/2010 | Noda et al. |
| 7,958,564 B2 | 6/2011 | Noda et al. |

(Continued)

FOREIGN PATENT DOCUMENTS

| EP | 2093535 A1 | 8/2009 |
| EP | 2664891 A1 | 11/2013 |

(Continued)

OTHER PUBLICATIONS

Search Report issued in European Patent Office (EPO) Patent Application No. 16170702.1, dated Feb. 7, 2017.

(Continued)

*Primary Examiner* — G. Bradley Bennett
(74) *Attorney, Agent, or Firm* — Greenblum & Bernstein, P.L.C.

(57) ABSTRACT

There is provided a method for controlling a shape measuring apparatus which continues to perform nominal scanning measurement to a workpiece having a slightly large deviation from a design data. A scanning path to move a stylus tip is calculated based on design data of a workpiece. The stylus tip is moved along the scanning path. It is monitored whether a distance between the scanning path and an actual workpiece is excessive. When the distance between the scanning path and the actual workpiece is excessive, a trajectory difference error is generated. When the trajectory difference error is generated, geometric correction is performed to the design data so that the design data approaches to the actual workpiece. Scanning measurement is performed based on the design data after the geometric correction.

6 Claims, 11 Drawing Sheets

(56) References Cited

U.S. PATENT DOCUMENTS

| | | |
|---|---|---|
| 8,478,564 B2 | 7/2013 | Noda et al. |
| 9,003,871 B2 | 4/2015 | Sadahiro |
| 9,298,178 B2 | 3/2016 | Noda et al. |
| 9,366,522 B2 | 6/2016 | Noda et al. |
| 2006/0056548 A1* | 3/2006 | Saito ............... G01D 18/00 375/345 |
| 2010/0250178 A1* | 9/2010 | Noda ............... G01B 5/008 702/95 |
| 2012/0055037 A1* | 3/2012 | Kumagai ............. G01B 5/12 33/503 |
| 2013/0041624 A1 | 2/2013 | Li |
| 2014/0025336 A1 | 1/2014 | Noda |
| 2014/0059872 A1* | 3/2014 | Nakagawa ........ G01B 21/045 33/502 |
| 2014/0076038 A1 | 3/2014 | Zimmerman |
| 2014/0232855 A1 | 8/2014 | Yamagata et al. |
| 2014/0253724 A1 | 9/2014 | Yamagata et al. |
| 2015/0241194 A1* | 8/2015 | Nakagawa ........ G01B 21/045 702/95 |
| 2015/0377617 A1* | 12/2015 | Ould ................. G01B 21/04 702/168 |
| 2016/0131470 A1* | 5/2016 | Ishikawa ......... G01B 21/045 33/503 |
| 2016/0258738 A1* | 9/2016 | Shimaoka .......... G01B 5/012 |
| 2016/0258744 A1* | 9/2016 | Shimaoka .......... G01B 11/14 |
| 2017/0089683 A1* | 3/2017 | Yokoyama .......... G01B 5/008 |
| 2017/0248402 A1* | 8/2017 | Koga ................. G01B 7/012 |
| 2017/0248409 A1* | 8/2017 | Sakai .............. G01B 11/2441 |

FOREIGN PATENT DOCUMENTS

| | | |
|---|---|---|
| JP | 2008-241420 A | 10/2008 |
| JP | 5089428 B | 12/2012 |
| JP | 2013-238573 A | 11/2013 |

OTHER PUBLICATIONS

U.S. Appl. No. 15/158,800 to Takashi Noda et al., filed May 19, 2016.

\* cited by examiner

METHOD FOR CONTROLLING SHAPE MEASURING APPARATUS

INCORPORATION BY REFERENCE

This application is based upon and claims the benefit of priority from Japanese patent application No. 2015-104422, filed on May 22, 2015, the disclosure of which are incorporated herein in its entirety by reference.

BACKGROUND OF THE INVENTION

1. Field of the Invention

The present invention relates to a method for controlling a shape measuring apparatus.

2. Description of Related Art

BACKGROUND ART

There has been known a shape measuring apparatus which measures a shape of an object by moving a stylus tip scanning a surface of the object (for example, see JP 2008-241420 A). The device disclosed in JP 2008-241420 A, first, converts a design data (for example, non-uniform rational B-spline (NURBS) data) based on CAD data into a group of polynomials curves in a predetermined degree. Here, it is assumed that the polynomials is a cubic function, and the curves are parametric cubic curves (PCC).

A PCC curve is divided, and a group of divided PCC curves is formed. A speed curve is calculated from the group of divided PCC curves, and then, a moving speed (moving vector) of a probe is calculated. (For example, a moving speed (moving vector) of a probe is set based on a curvature of each segment of the group of divided PCC curves or the like.) The probe is moved according to the moving speed calculated in the above manner, and a stylus tip is moved scanning the surface of the object (passive nominal scanning measurement: scanning along a predetermined trajectory calculated in advance based on the design data of the object.).

Furthermore, there has been known a method to perform scanning measurement while correcting a trajectory by continuously calculating a deflection correction vector so as to keep an amount of deflection of a probe constant (JP 2013-238573 A). In this description, such a nominal scanning measurement is referred to as "active nominal scanning measurement".

Moreover, there has been known a method to perform scanning measurement while generating a trajectory without using design data (autonomous scanning measurement, for example, JP 5089428 B).

SUMMARY OF THE INVENTION

Technical Problem

As described above, there are three measurement methods of passive nominal scanning measurement, active nominal scanning measurement, and autonomous scanning measurement, and each of them has merits and demerits. For example, although all workpieces could be measured by the autonomous scanning measurement, the autonomous scanning measurement takes a long time.

For example, a moving speed of a probe in the autonomous scanning measurement is about 10 mm/sec to 15 mm/sec, and a moving speed of a probe in the nominal scanning measurement is about 50 mm/sec to 100 mm/sec.

Thus, it is expected that the autonomous scanning measurement takes time about ten times longer than the nominal scanning measurement.

On the other hand, in the nominal scanning measurement, when a deviation between a design data and an actual workpiece is too large, the measurement is terminated due to an error. When a probe (stylus tip) leaves a workpiece surface, or when the probe is excessively pushed to a workpiece surface, the error is generated, and the measurement is terminated at that point due to the error.

In the active nominal scanning measurement, a certain amount of deviation can be corrected. However, when a deviation exceeds a tolerance range, it cannot be corrected and an error is generated. In the active nominal scanning measurement, a tolerance range of a deviation is about plus or minus 1.5 mm.

When a workpiece has 500 mm length, the difference between a design data and an actual workpiece is generally within 1 mm, and the difference can be mostly handled by the active nominal scanning measurement. However, changes in a machine or a tool might generate a deviation more than 1.5 mm from the design data.

The active nominal scanning measurement cannot be frequently performed in such cases. Thus, a user is required to change the setting to the autonomous scanning measurement and measure the workpiece again, or slightly adjust the scanning trajectory and perform the nominal scanning measurement again, and which makes the user feel inconvenient.

A purpose of the present invention is to provide a method for controlling a shape measuring apparatus which continues to perform nominal scanning measurement to a workpiece having a slightly large deviation from a design data.

Solution to Problem

A method in an exemplary embodiment of the present invention for controlling a shape measuring apparatus including a probe having a stylus tip at a tip, and a moving mechanism which moves the stylus tip scanning a surface of a workpiece, and configured to measure a shape of the workpiece by detecting contact between the stylus tip and the surface of the workpiece, the method includes:

calculating a scanning path to move the stylus tip based on design data of the workpiece;

moving the stylus tip along the scanning path; monitoring whether a distance between the scanning path and an actual workpiece is excessive;

generating a trajectory difference error when the distance between the scanning path and the actual workpiece is excessive;

performing, when the trajectory difference error is generated, geometric correction to the design data such that the design data approaches to the actual workpiece; and performing scanning measurement based on the design data after the geometric correction.

In an exemplary embodiment of the present invention, the geometric correction is preferably one or more correction calculations selected from reduction, enlargement, rotation translation, and parallel translation.

In an exemplary embodiment of the present invention, the method preferably includes:

performing, when the trajectory difference error is generated, point measurement at a plurality of points of the workpiece; and determining a method of the geometric correction based on coordinates of the measurement points obtained by the point measurement.

In an exemplary embodiment of the present invention, the method preferably includes:

performing, when the trajectory difference error is generated again as a result of performing the scanning measurement based on the design data after the geometric correction, autonomous scanning measurement to the workpiece;

correcting the design data based on a measurement result obtained by the autonomous scanning measurement; and performing the scanning measurement based on the design data after the correction.

In an exemplary embodiment of the present invention, the method preferably includes:

determining, when the trajectory difference error is generated, whether a measuring target is two-dimensional; and performing, when the measuring target is two-dimensional, the geometric correction.

A non-volatile recording medium storing a program of an exemplary embodiment of the present invention is to cause a computer to execute a method for controlling a shape measuring apparatus.

BRIEF DESCRIPTION OF THE DRAWINGS

Brief Description of Drawings

Figure 1:
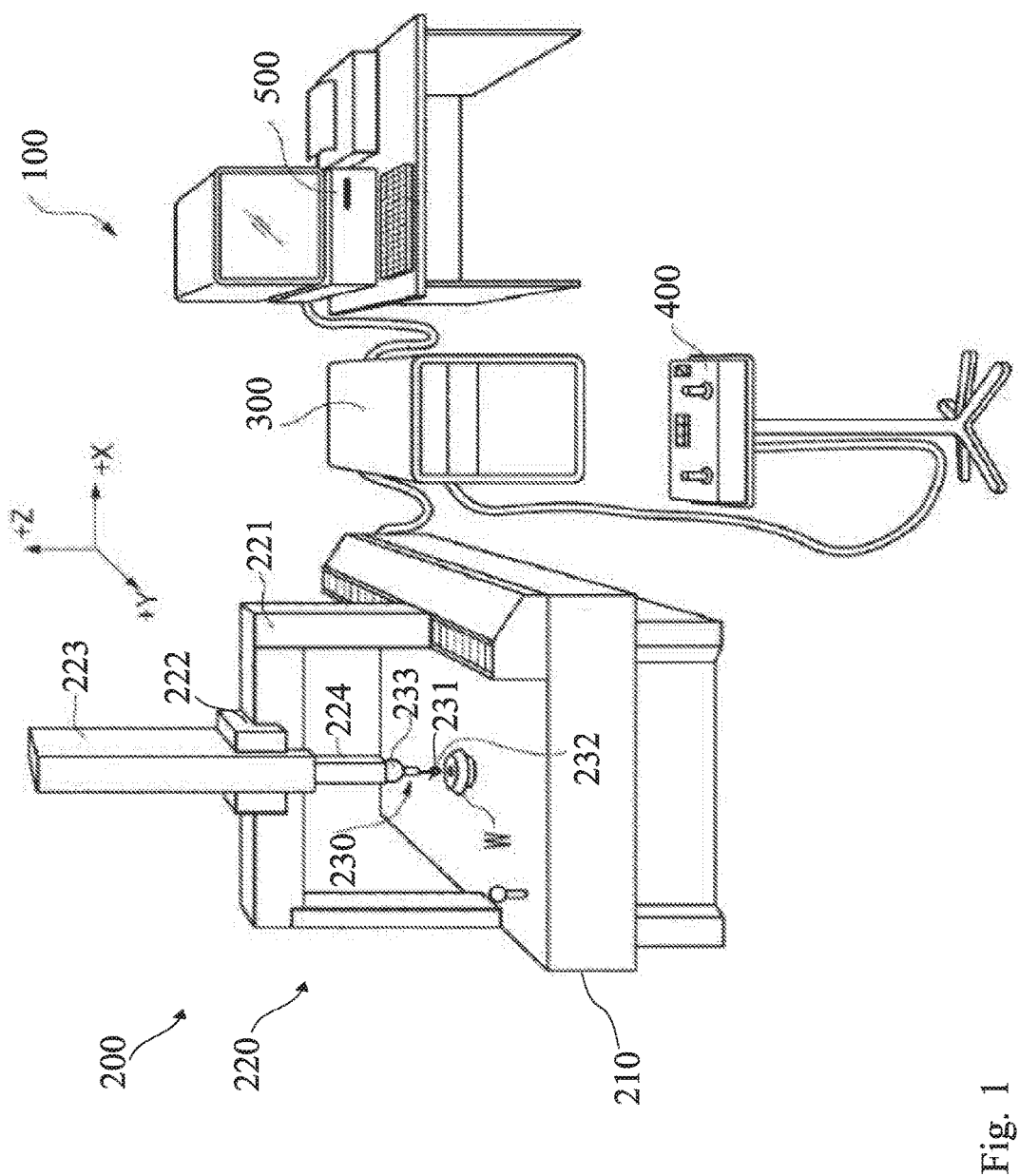
Figure 2:
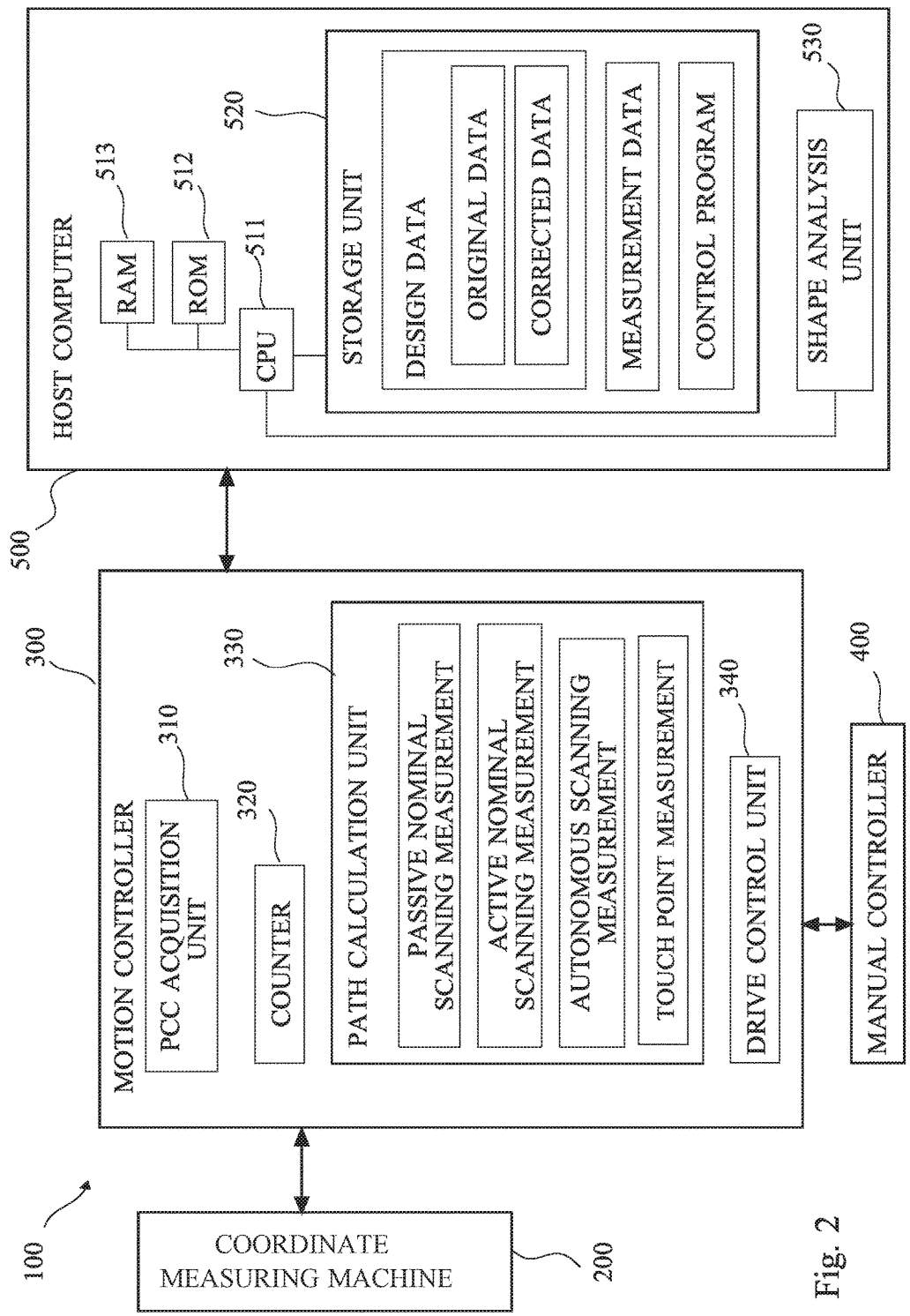
Figure 3:
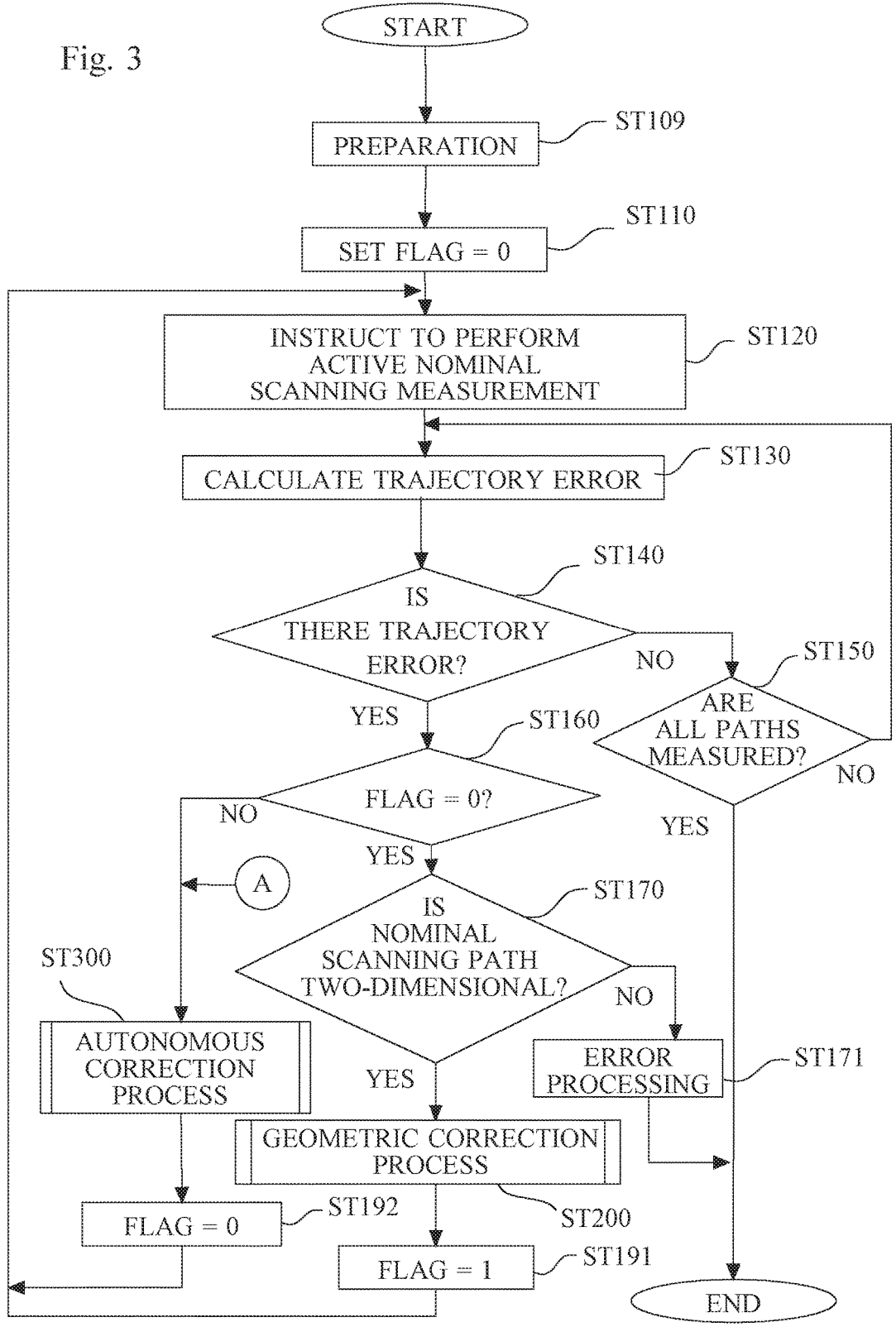
Figure 4:
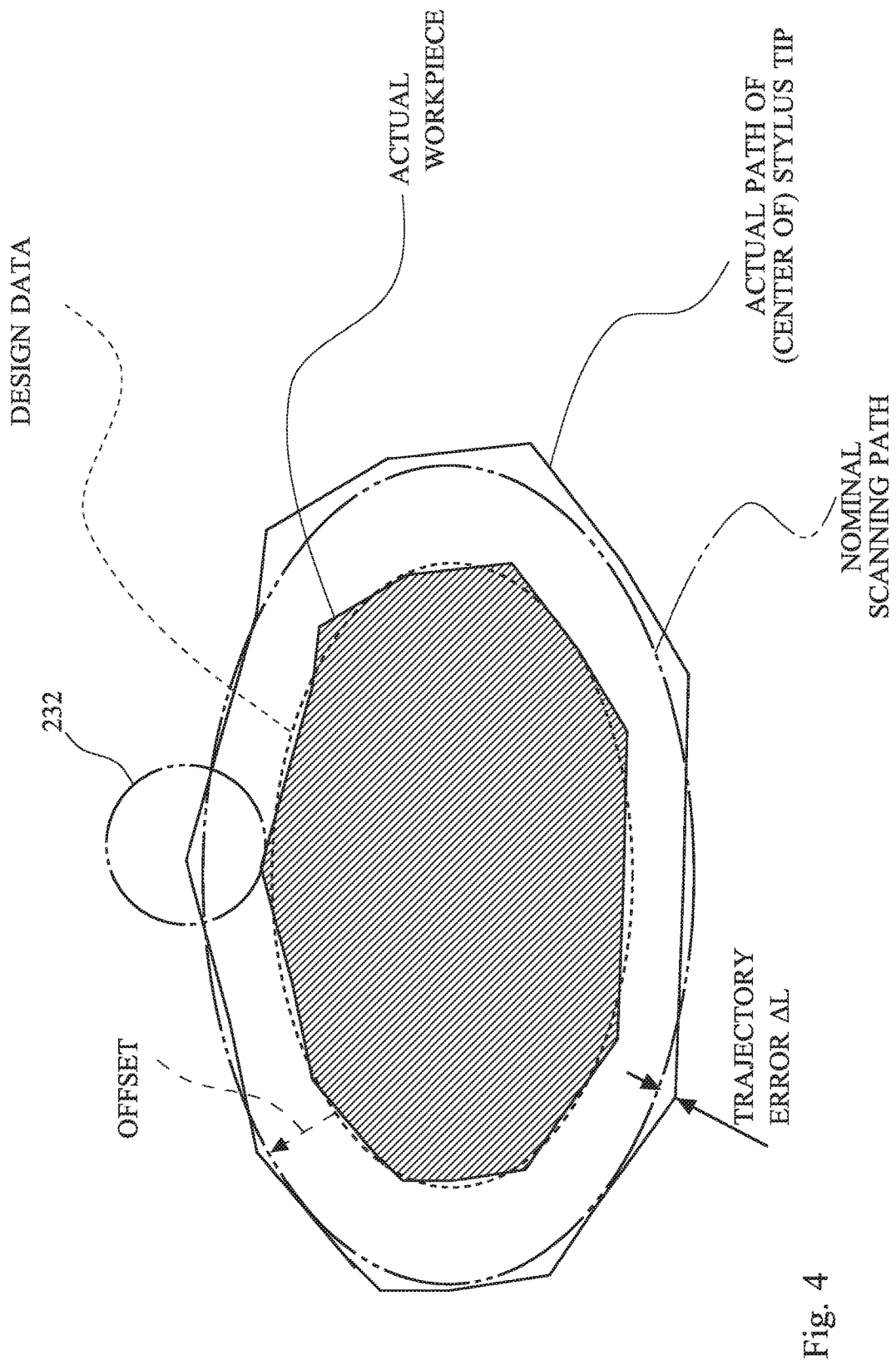
Figure 5:
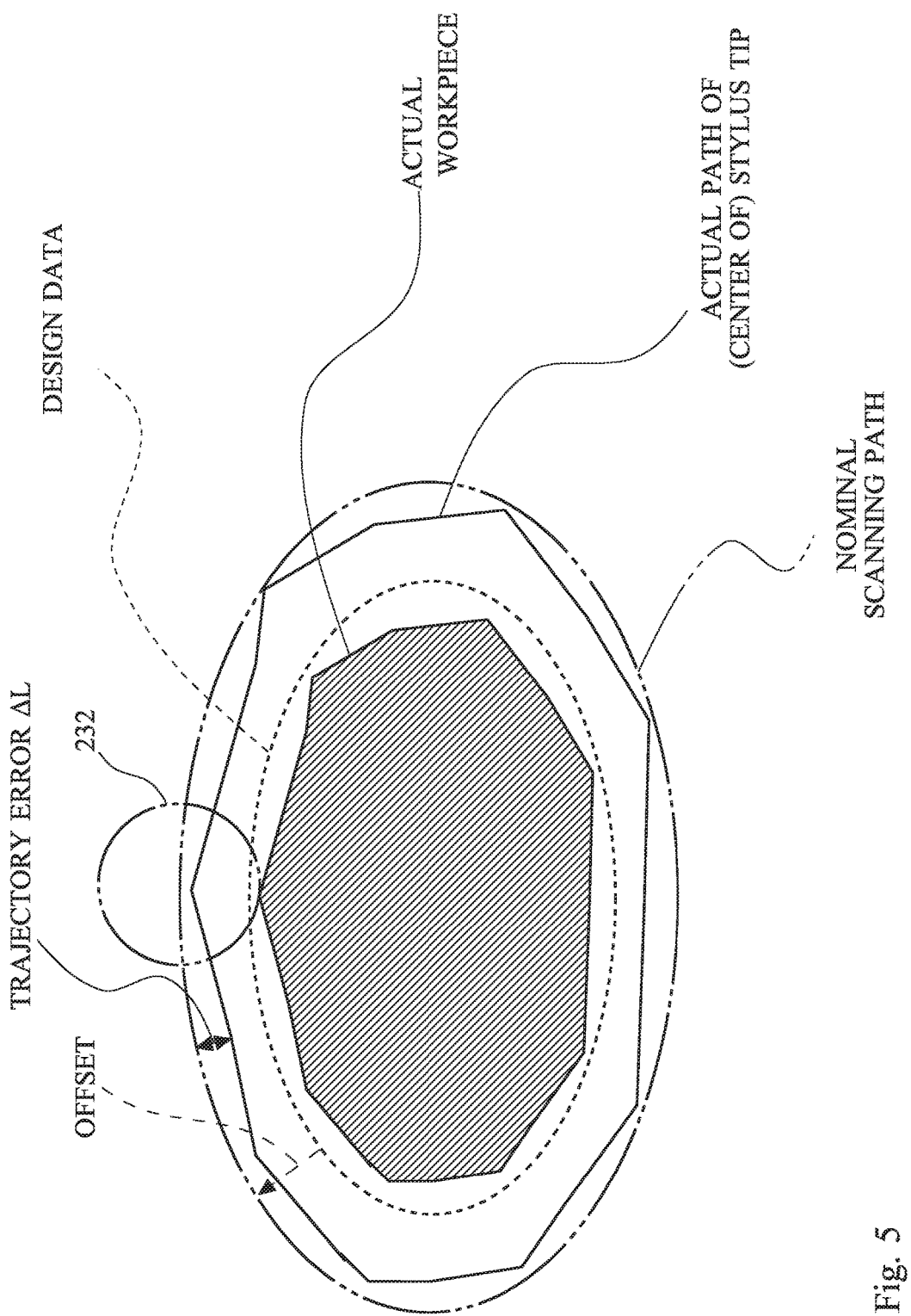
Figure 6:
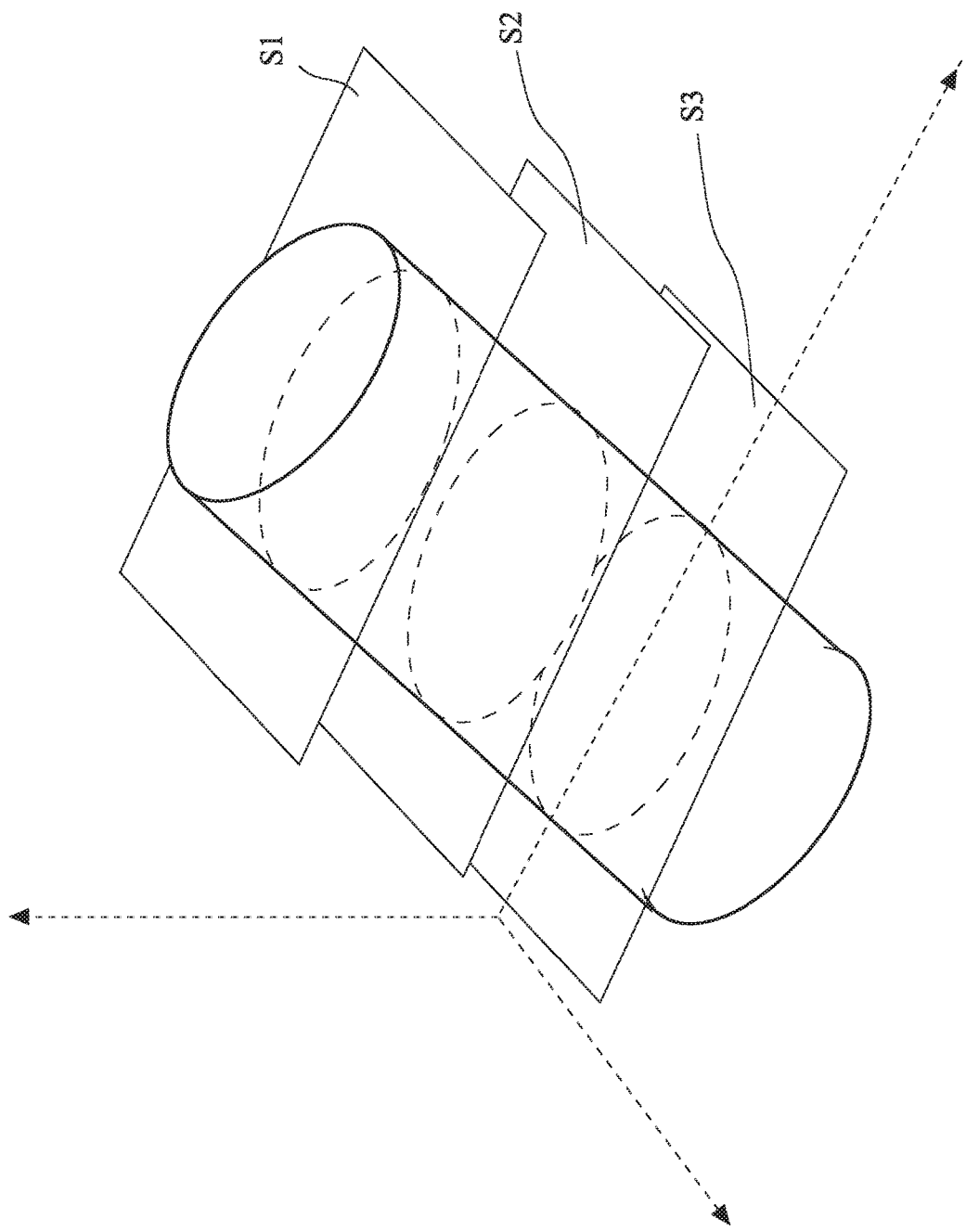
Figure 7:
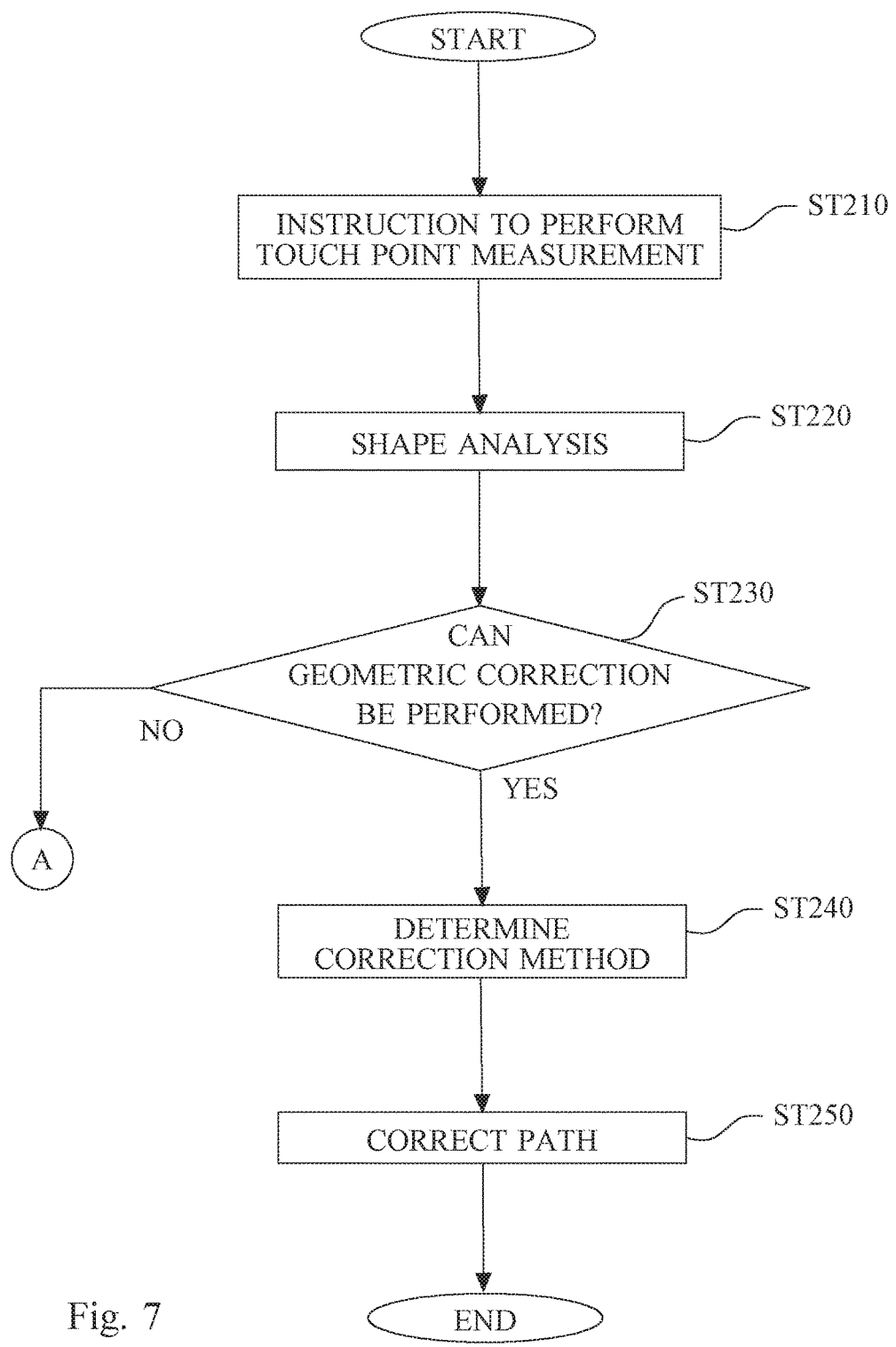
Figure 8:
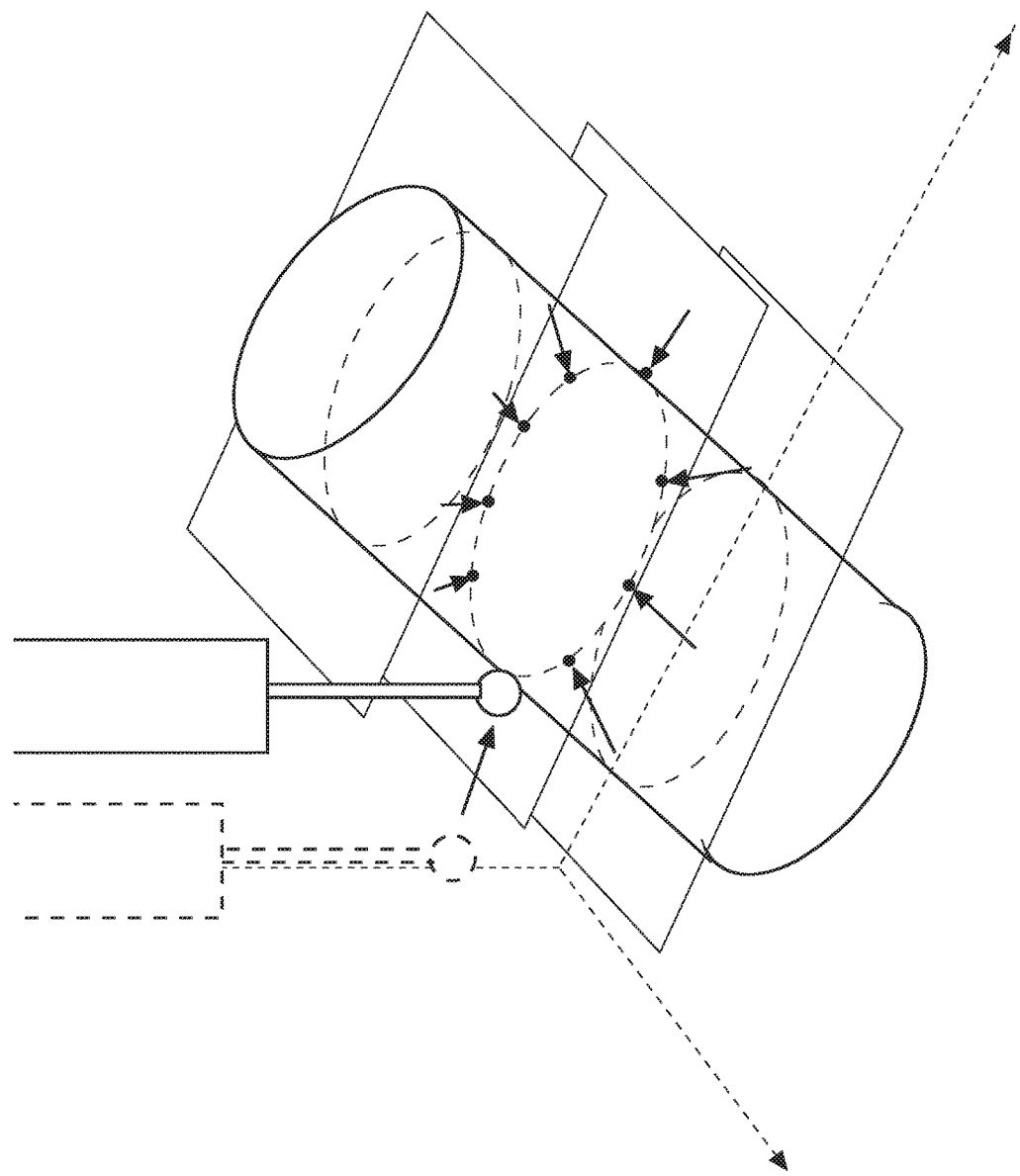
Figure 9:
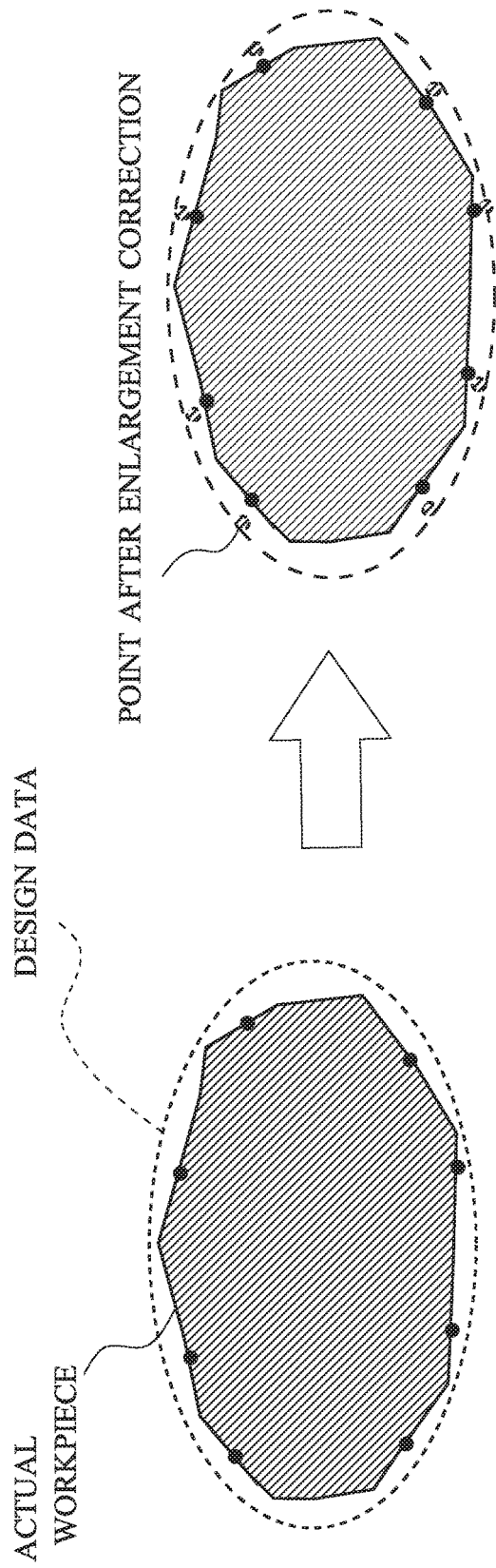
Figure 10:
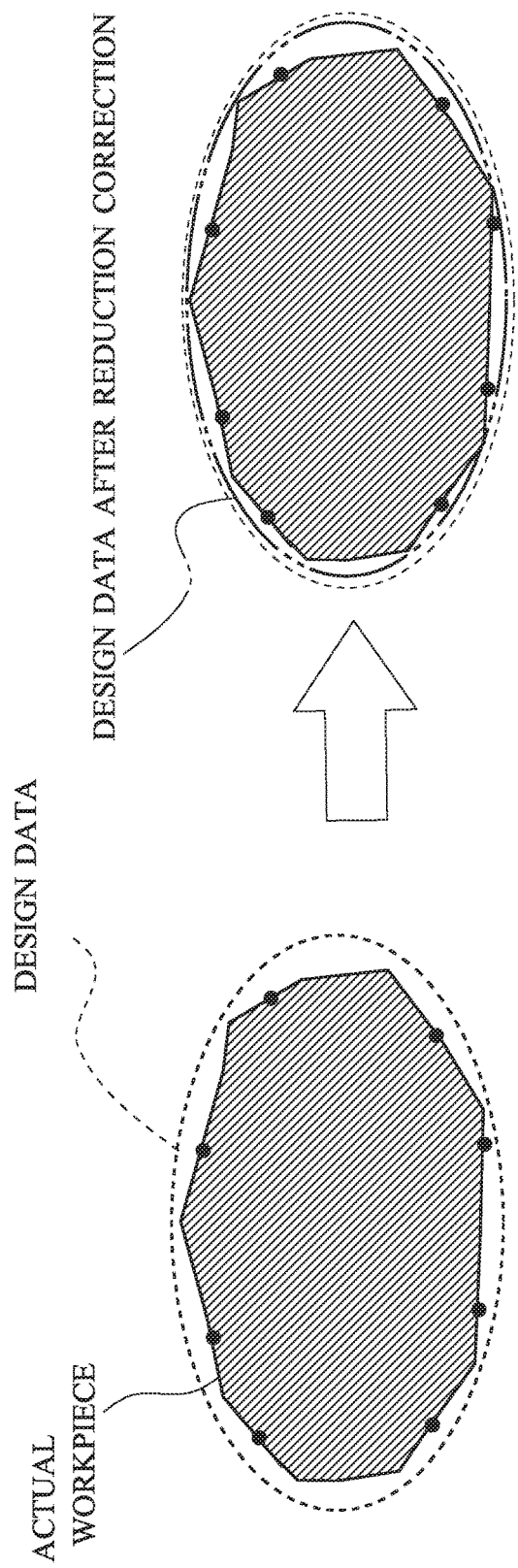

FIG. 1 is a diagram illustrating a configuration of an entire shape measurement system;

FIG. 2 is a functional block diagram of a motion controller and a host computer;

FIG. 3 is a flowchart of operations of nominal scanning measurement with error correction;

FIG. 4 is a diagram for explaining a trajectory difference;

FIG. 5 is a diagram illustrating when a trajectory difference is large;

FIG. 6 is a diagram illustrating a two-dimensional scanning section;

FIG. 7 is a flowchart illustrating procedures of a geometric correction process;

FIG. 8 is a diagram for explaining touch point measurement;

FIGS. 9(A) and 9(B) are diagrams for explaining geometric correction;

FIGS. 10(A) and 10(B) are diagrams for explaining geometric correction; and

Figure 11:
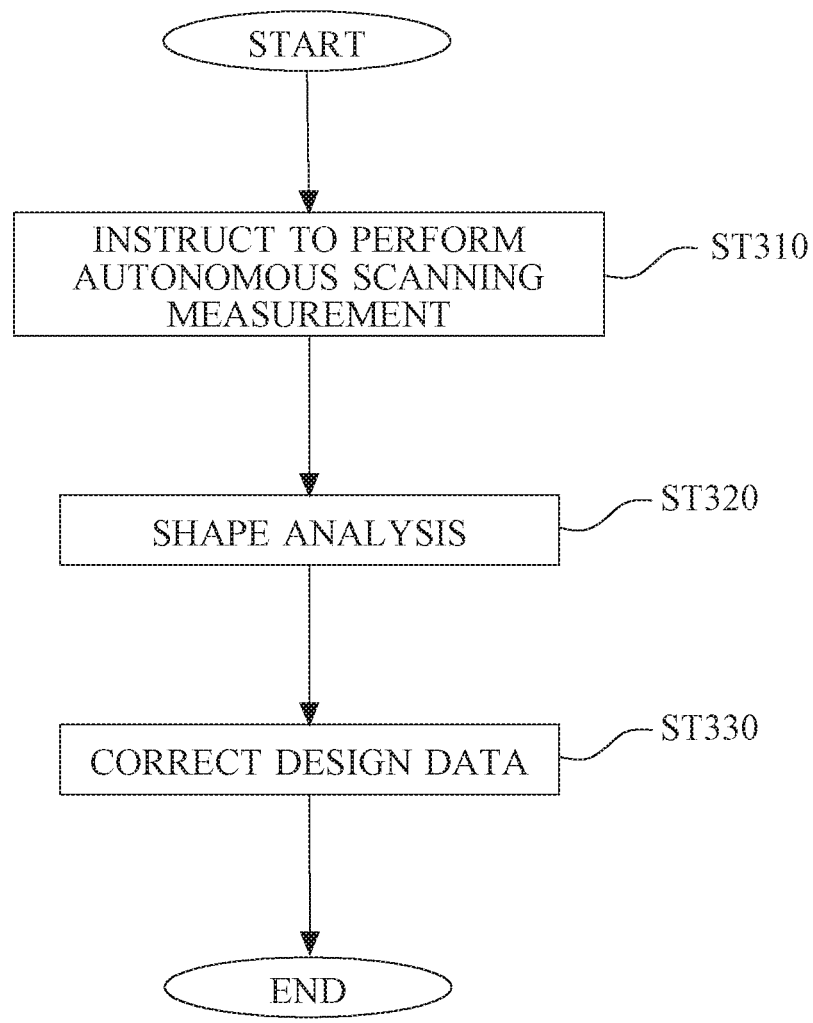

FIG. 11 is a flowchart illustrating procedures of an autonomous correction process.

DETAILED DESCRIPTION

Description of Embodiments

An embodiment of the present invention will be illustrated and described with reference to reference signs assigned to elements in the drawings.

First Exemplary Embodiment

FIG. 1 is a diagram illustrating a configuration of an entire shape measurement system 100.

The basic configuration of the shape measurement system 100 has been known, but will be briefly described.

The shape measurement system 100 includes a coordinate measuring machine 200, a motion controller 300 which controls the drive of the coordinate measuring machine 200, and a host computer 500 which controls the motion controller 300 and executes necessary data processing.

The coordinate measuring machine 200 includes a base 210, a moving mechanism 220, and a probe 230.

The moving mechanism 220 includes a gate type Y slider 221, an X slider 222, a Z axis column 223, and a Z spindle 224. The Y slider 221 is provided slidably on the base 210 in a Y direction. The X slider 222 slides along a beam of the Y slider 221 in an X direction. The Z axis column 223 is secured to the X slider 222. The Z spindle 224 moves up and down inside the Z axis column 223 in a Z direction.

A driving motor (not illustrated) and an encoder (not illustrated) are fixed on each of the Y slider 221, the X slider 222, and the Z spindle 224.

Drive control signals from the motion controller 300 control the drive of the driving motors. The encoder detects a moving amount of each of the Y slider 221, the X slider 222, and the Z spindle 224, and outputs the detection value to the motion controller 300. The probe 230 is attached to the lower end of the Z spindle 224.

The probe 230 includes a stylus 231 and a supporting part 233. The stylus 231 has a stylus tip 232 at a tip side (−Z axis direction side). The supporting part 233 supports the base end side (+Z axis direction side) of the stylus 231.

The stylus tip 232 has a spherical shape and is brought into contact with an object W.

When an external force is applied to the stylus 231, that is, when the stylus tip 232 is brought into contact with an object, the supporting part 233 supports the stylus 231 so that the stylus 231 is movable in the directions of the X, Y, and Z axes within a certain range. The supporting part 233 further includes a probe sensor (not illustrated) to detect a position of the stylus 231 in each axis direction. The probe sensor outputs the detection value to the motion controller 300.

(Configuration of the Motion Controller 300)

FIG. 2 is a functional block diagram of the motion controller 300 and the host computer 500. The motion controller 300 includes a PCC acquisition unit 310, a counter 320, a path calculation unit 330, and a drive control unit 340.

The PCC acquisition unit 310 acquires PCC curve data from the host computer 500.

The counter 320 measures a displacement amount of each slider by counting detection signals output from the encoder, and measures a displacement amount of the probe 230 (the stylus 231) by counting detection signals output from each sensor of the probe 230. From the measured displacement of the slider and the probe 230, a coordinate position PP (hereinafter, referred to as a probe position PP) of the stylus tip 232 is obtained. Furthermore, from the displacement (the detection value of the probe sensor (Px, Py, Pz)) of the stylus 231 measured by the counter 320, an amount of deflection of the stylus tip 232 (an absolute value of a vector Ep) is obtained.

The path calculation unit 330 calculates a movement path for the probe 230 (the stylus tip 232) to measure an object surface with the probe 230 (the stylus tip 232), and calculates a velocity component vector (path velocity vector) along the movement path.

The path calculation unit 330 includes functional units to calculate a path according to measurement methods (measurement modes). Specifically, there are four methods of passive nominal scanning measurement, active nominal scanning measurement, autonomous scanning measurement, and point measurement. The measurement methods will be described later as needed.

The drive control unit 340 controls the drive of each slider based on the moving vector calculated by the path calculation unit 330.

Note that, a manual controller 400 is connected to the motion controller 300.

The manual controller 400 includes a joystick and various buttons, receives a manual input operation from a user, and transmits the user's operation instruction to the motion controller 300.

In this case, the motion controller 300 (the drive control unit 340) controls the drive of each slider in response to the user's operation instruction.

(Configuration of the Host Computer 500)

The host computer 500 includes a central processing unit (CPU) 511 and a memory, and controls the coordinate measuring machine 200 through the motion controller 300.

The host computer 500 further includes a storage unit 520 and a shape analysis unit 530.

The storage unit 520 stores design data related to a shape of an object (workpiece) W, such as CAD data or NURBS data, measurement data obtained by measurement, and a measurement control program to control a whole measurement operation.

The shape analysis unit 530 calculates surface shape data of the measured object based on the measurement data output from the motion controller 300, and performs shape analysis to calculate the error or the distortion of the calculated surface shape data of the measured object. The shape analysis unit 530 further performs arithmetic processing, such as conversion of design data (CAD data, NURBS data, or the like) into PCC curves.

The CPU 511 executes the measurement control program, and thus the measurement operation of the present exemplary embodiment is implemented.

An output device (a display or a printer) and an input device (a keyboard or a mouse) are connected to the host computer 500 as needed.

(Description of the Measurement Operation)

The measurement operation will be described in order.

The present exemplary embodiment is nominal scanning measurement having a function to automatically correct an error, and is referred to as "nominal scanning measurement with error correction". Procedures of the present exemplary embodiment are illustrated in FIG. 3.

FIG. 3 is a flowchart for explaining operations in the nominal scanning measurement with error correction.

A user places a workpiece as an object to be measured on the base 210, and stores the design data of the workpiece in the storage unit 520. The design data of the workpiece is stored in the storage unit 520 as "original data" (ST109).

In order to perform the nominal scanning measurement with error correction, a flag to properly handle a control loop is prepared, and the host computer 500 sets the flag to "0" at first (ST110).

The flag will become clear in the later description, but is briefly described below. The flag is set to "1" in the case when geometric correction is performed to a nominal scanning path, and the flag is set to "0" in other cases (when geometric correction is not performed to a nominal scanning path).

Next, the host computer 500 instructs the motion controller 300 to perform the nominal scanning measurement (ST120). Here, it is assumed that the nominal scanning measurement is the active nominal scanning measurement.

Then, the motion controller 300 calculates a path to perform the scanning measurement to the workpiece, and moves the probe 230 along the path. The nominal scanning measurement itself has been known, and the active nominal scanning measurement has also been detailedly described in, for example, JP 2013-238573 A.

The detailed description is omitted, but the active nominal scanning measurement is briefly described below.

The original data is, for example, CAD data (for example, NURBS data). First, the CAD data (for example, NURBS data) is converted into data of a group of points. The data at each point is combined data of coordinates (x, y, z) and normal line directions (P, Q, R). (That is, the data indicates (x, y, z, P, Q, R).) The coordinates at each point are offset by a predetermined amount in the normal line direction. (The predetermined amount is, particularly, a stylus tip radius r—an amount of deflection Ep.)

The data of the group of points calculated in this manner is converted into a group of PCC curves. The group of PCC curves is further divided at multiple points into segments (divided PCC curves). The processing up to now is performed by the arithmetic processing in the host computer 500. The PCC curves generated in this manner is transmitted to the motion controller 300, and temporarily stored in the PCC acquisition unit 310.

The path calculation unit 330 generates, based on the acquired PCC curve, a path to measure the workpiece. The path calculation unit 330 generates a path according to a measurement method. Here, since the (active) nominal scanning measurement is selected, the path for the (active) nominal scanning measurement is selected. (Note that, paths generated for the passive nominal scanning measurement and for the active nominal scanning measurement are the same.)

Then, the path calculation unit 330 sets, based on the curvature of the divided PCC curve, the moving speed of the probe 230, and determines the moving direction and the moving speed (velocity vector) at each point on the PCC curve. The movement of the probe 230 according to the moving vector implements the nominal scanning measurement.

Furthermore, in the active nominal scanning measurement, a vector in the normal line direction (deflection correction vector) is generated so as to keep the amount of deflection Ep constant, and a trajectory correction direction (trajectory correction vector) to correct the deviation between the center coordinates and the path for the current stylus tip 232 is generated. Then, a combined velocity vector, which is obtained by combining the velocity vector, the deflection correction vector, and. the trajectory correction vector, is generated.

The drive control unit 340 supplies drive signals to the coordinate measuring machine 200 according to the combined velocity vector. Thus, the coordinate measuring machine 200 measures the workpiece by the active nominal scanning measurement.

The drive signal from the motion controller 300 drives the coordinate measuring machine 200, and thus the active nominal scanning measurement is performed. The coordinate measuring machine 200 feedbacks detection values (a probe sensor detection value and an encoder detection value) to the host computer 500 through the motion controller 300. Then, the host computer 500 calculates a trajectory difference ΔL (ST130).

In other words, the host computer 500 calculates the trajectory difference ΔL by comparing the path calculated as the nominal scanning trajectory (for example, a PCC curve) with the current position of the stylus tip 232.

An example is illustrated in FIG. 4.

In FIG. 4, it is assumed that the workpiece is machined according to the design data. It is unavoidable that an actually finished workpiece has slight deviation from the design data due to a degree of accuracy of the machine. The path (PCC curve) for the nominal scanning measurement is obtained by adding a predetermined offset to the design data. After the nominal scanning measurement, the drive of the coordinate measuring machine 200 is controlled so that the stylus tip 232 is moved from an interpolation point (i) to the next interpolation point (i+1) of the path (PCC curve).

Since the active nominal scanning measurement is performed at this time, a correction vector is added to the normal line direction so as to keep the deflection constant, and the stylus tip 232 is to perform scanning movement on the workpiece surface at a constant pushing force.

(The curvature of each segment of the PCC curve determines how fine the intervals of the interpolation points are set, and the stylus tip 232 is adjusted so as not to largely leave the workpiece in linear interpolation. However, the paths of the actual stylus tip 232 have a polygonal shape obtained by connecting multiple straight lines due to delay of control response, or vibration or distortion of the machine itself. Note that, the present invention does not matter such a trivial issue, and thus the illustration of FIG. 4 is simplified.)

The coordinate measuring machine 200 feedbacks the position of the actual stylus tip 232 to the host computer 500 through the motion controller 300. The host computer 500 compares the nominal scanning path with the actual position of the stylus tip 232 (the center coordinates of the stylus tip 232), and calculates the gap between them in the direction along the normal line direction of the workpiece. The gap is the trajectory difference ΔL.

Next, it is determined whether the trajectory difference ΔL is within a predetermined tolerance range (ST140). The predetermined tolerance range is set in advance and is, for example, about 1.5 mm. When the trajectory difference ΔL exceeds the tolerance range (1.5 mm), that generates a trajectory difference error (ST140: YES).

When there is no trajectory difference error (ST140: NO), ST130 and ST 140 are looped until all of the measuring targets (for example, the entire workpiece) are measured. When all of the measuring targets (for example, the entire workpiece) are measured (ST150: YES), the measurement is terminated.

The case where a trajectory difference error is generated is exemplified (ST140: YES). For example, it is assumed that the actual workpiece is machined slightly smaller than the design data a.s illustrated in FIG. 5. This can happen due to the accuracy of the machine, or the deterioration or the attachment error of the tool.

In this case, when the probe 230 (the stylus tip 232) is moved along the workpiece surface so as to keep the deflection Ep constant, the deviation between the (original) nominal scanning path and the position of the actual stylus tip 232 (the center coordinates of the stylus tip 232) increases. This generates a point where the trajectory difference ΔL exceeds the tolerance range (1.5 mm).

When the trajectory difference ΔL exceeds the tolerance range (1.5 mm) (ST140: YES), the host computer 500 checks the flag.

When the flag is "0" (ST160: YES), then, the host computer 500 confirms whether the path for the nominal scanning measurement is two-dimensional.

Here, that the nominal scanning path is two-dimensional indicates, for example, that the workpiece itself is two-dimensional. In other words, the workpiece itself is a thin flat plate, or has a shape like a plain washer. Furthermore, although the workpiece itself is a three-dimensional, the measurement is performed to some planes cut from the workpiece. In other words, a scanning section is two-dimensional. The workpiece may be cut in a plane vertical to the coordinate axis such as a plane parallel to an XY plane or an XZ plane, and may also be cut in an oblique plane as illustrated in FIG. 6.

When the scanning path is not two-dimensional (ST170: NO), it is difficult to perform geometric correction, which will be described later, and autonomous correction, and error processing is performed (ST171), then, the measurement operation is terminated.
(That the scanning path is not two-dimensional indicates, for example, that the scanning path is three-dimensional. For example, when scanning measurement is spirally performed to a spherical surface, the scanning path is three-dimensional.)

When the scanning path is two-dimensional (ST170), the geometric correction is performed (ST200).

Procedures of a geometric correction process (ST200) will be descried with reference to the flowchart of FIG. 7.

To perform the geometric correction process (ST200), the host computer 500 instructs the motion controller 300 to perform point measurement first. The point measurement (alternatively, referred to as touch point measurement) has been well known, but is briefly described (see FIG. 8).

In the measurement method, the probe 230 is temporarily separated from the workpiece. Then, the probe 230 (the stylus tip 232) is moved close to the workpiece and fetches the coordinate value when the amount of deflection becomes a predetermined value (for example, 0.3 mm).

The normal line direction of the workpiece can be known based on the design data, and the probe 230 (the stylus tip 232) is moved until being brought into contact with the workpiece in the normal line direction. The measurement is performed at several points.

The result of the point measurement is transmitted to the host computer 500. The host computer 500 roughly calculates the shape (of the section) of the workpiece from the result of the point measurement, and further performs shape analysis (ST220). In the shape analysis, arithmetic processing, in which the coordinates obtained by the point measurement is compared with the point corresponding to the design data (or the PCC curve) and a deviation at each point is calculated, is performed.

The shape analysis process (ST220) is a preparation for the next process (ST230), and the method of the shape analysis is not limited as long as the next process (ST230) is performed. Since necessary shape analysis is different according to the prepared geometric correction, the detailed explanation is omitted, but it is sufficient to perform geometrically simple arithmetic processing.

Next, the host computer 500 determines, based on the result of the shape analysis, whether the geometric correction can be performed (ST230). In the geometric correction, geometrically simple arithmetic processing, such as reduction, enlargement, rotation translation, or parallel translation, is intended. In other words, the host computer 500 determines whether the design data can approach the actual workpiece by performing, to the design data, simple geometric correction, such as reduction, enlargement, rotation translation, or parallel translation.

In the case of reduction or enlargement, the design data is evenly reduced or enlarged (centering an appropriate point at an appropriate magnification), and can also be elongated or contracted in a certain direction. In the case of the geometric correction, reduction, enlargement, rotation translation, or parallel translation may be separately performed, and may be also performed by combining some of them.

For example, it is assumed that when the enlargement is evenly performed to a multiple points obtained by the point measurement (centering an appropriate point at an appropriate magnification), the points in the point measurement approach the design data. Here, when the enlargement is performed to the points in the point measurement in FIG. 9(A), the gap between the actual workpiece and the design data is decreased as illustrated in FIG. 9(B). At this time, when the operation opposite to the enlargement, that is, reduction correction is performed to the design data, the gap between the design data after the correction and the actual workpiece is to be decreased. (In other words, the workpiece is evenly shaved more than the design data.)

For example, when the reduction is performed to the design data in FIG. 10(A), the design data after the correction is to approach the actual workpiece as illustrated in FIG. 10(B). Then, when the nominal scanning path is set again based on the design data after the geometric correction, the nominal scanning measurement is to be performed according to the path.

Some menus for the geometric correction are prepared in advance, and the geometric correction is performed to the design data.

Then, if there is a geometric correction menu in which the gap calculated in ST220 is evenly decreased comparing the design data after the correction with the point in the point measurement, it is determined that the geometric correction can be performed (ST230: YES).

Note that, the case where it is determined that the geometric correction cannot be performed (ST230: NO) will be described later.

When the geometric correction can be performed (ST230: YES), a correction method is selected (ST240), and the geometric correction is performed to the measuring target part of the design data (the PCC curve).

The design data after the correction is stored in the storage unit 520.

It is unnecessary to correct the design data for the entire workpiece when the workpiece is three-dimensional. The correction only needs to be performed to the scanning section which is the current measuring target. For example, it is assumed that the workpiece is to be measured at three scanning sections of S1, S2, and S3 in FIG. 6, if the current scanning measurement target is the scanning section S2 in the middle, it is sufficient to perform the correction only to the scanning section S2.

Furthermore, note that the reduction correction performed to the design data does not mean that a workpiece smaller than the original design data is intended. The main purpose of the reduction correction is to generate a suitable scanning path to perform the nominal scanning measurement to an actually finished workpiece.

The path for the nominal scanning measurement is corrected based on the design data after the correction (ST250).

With the correction, the geometric correction process is terminated (ST200).

When the geometric correction is performed, the flag is set to "1" (ST191).

Then, returning back to ST120, the active nominal scanning measurement is performed. If the geometric correction (ST200) is succeeded, the trajectory difference ΔL does not exceed the tolerance range (ST140: NO) and the measurement of the workpiece is to be completed with the nominal scanning measurement (ST150: YES).

When the nominal scanning measurement is performed to all of the scheduled paths, the measurement is terminated.

(This means that the measurement of the scanning section S2 is terminated, and the measurement of scanning section S3 is to be subsequently performed as needed.)

Although the geometric correction is performed, the trajectory difference ΔL might exceed the tolerance range (plus or minus 1.5 mm).

For example, the workpiece is not evenly shaved, but shaved excessively or insufficiently in some parts.

Such a situation cannot be handled by the even geometric correction, such as reduction, enlargement, rotation translation, or parallel translation, alone.

The case, where a trajectory difference error is generated in the (active) nominal scanning measurement after the geometric correction is performed (that is, flag=1), will be described. When a trajectory difference error is generated in the (active) nominal scanning measurement after the geometric correction is performed (that is, flag=1) (ST140: YES), the host computer 500 checks the flag similarly to the previous time (ST160).

The flag equals "1" at this time (ST160: NO). In this case, the autonomous correction process (ST300) is performed. Procedures of the autonomous correction process (ST300) will be described with reference to the flowchart of FIG. 11.

To perform the autonomous correction process (ST300), the host computer 500 instructs the motion controller 300 to perform the autonomous scanning measurement (ST310). The autonomous scanning measurement itself has been well known (JP 5089428 B).

The measurement result obtained by the autonomous scanning measurement is transmitted to the host computer 500. The host computer 500 calculates the shape of (the section of) the workpiece from the measurement result obtained by the autonomous scanning measurement, and performs shape analysis (ST320).

In other words, the shape of (the section of) the workpiece is obtained by adding the radius r and the amount of deflection Ep of the stylus tip 232 to the center coordinates of the stylus tip 232. The data obtained in this manner is saved as the corrected data.

Then, a nominal scanning path is set again based on the shape data of the workpiece obtained by the autonomous scanning measurement (ST330).

The autonomous correction process (ST300) is terminated.

When the autonomous correction process is performed (ST300), the flag is returned to "0".

The processing is returned back to ST120 again, and the active nominal scanning measurement is performed. If the autonomous correction is succeeded, the trajectory difference ΔL does not exceed the tolerance range (ST140: NO) and the measurement of the workpiece is to be completed with the nominal scanning measurement (ST150: YES). When all of the scheduled paths are measured, the nominal scanning measurement is terminated.

The description for the case where the geometric correction cannot be performed (ST230: NO) has been skipped from the description of FIG. 7 (the geometric correction process ST200).

To supplement the skipped description here, if there is no applicable geometric correction (ST230: NO), the measurement shifts to the autonomous correction process (ST300).

If workpieces (products) are machined based on the same design data by the same machine, the second and following workpieces are to be measured by the nominal scanning measurement without an error.

According to the present exemplary embodiment "the nominal scanning measurement with error correction" has the following effects:

(1) Since (active) nominal scanning measurement is mainly performed, it is expected to have a measurement efficiency five to ten times higher than the case where autonomous scanning measurement is only performed. Furthermore, if a trajectory difference error is generated during the (active) nominal scanning measurement, the scanning measurement is continued by automatically correcting the error by geometric correction or autonomous correction.

Conventionally, the measurement has been forcibly terminated when a trajectory difference error is generated, and a user has been required to clear the error and perform the measurement again after changing the setting. In this case, the user has been required to perform the autonomous scanning measurement to the entire workpiece or perform the measurement again after slightly adjusting the scanning path. (To slightly correct the scanning path manually needs high expertise.)

In this regard, according to the present exemplary embodiment, it is possible to efficiently measure a workpiece slightly different from design data in a short time.

(2) If a trajectory difference error is generated, a scanning path is corrected by simple geometric correction based on simple point measurement. Then, the (active) nominal. scanning measurement is continued with the corrected scanning path, which significantly shorten the measurement time compared with performing the autonomous scanning measurement.

(3) Although there is a machining error which cannot be handled by the geometric correction, it is possible to correct the scanning path by automatically performing the autonomous scanning measurement to the necessary point. Thus, a user's labor can be significantly reduced.

Note that, the present invention is not limited to the above exemplary embodiment, and can be appropriately modified without departing from the scope of the present invention.

The active nominal scanning measurement has been performed in the above exemplary embodiment, but passive nominal scanning measurement may be performed instead.

In such a case, a trajectory difference error indicates that an amount of deflection is too large, or, that a stylus tip leaves a workpiece surface.

In the above exemplary embodiment, when the geometric correction is not succeeded, the autonomous correction process (ST300) is performed.

Naturally, in the case of the coordinate measuring machine 200 or the probe 230 which does not have a function of the autonomous scanning measurement, the autonomous correction process (ST300) is skipped, and the measurement may be terminated "due to the error" when the geometric correction is not succeeded.

If the autonomous correction process (ST300) is performed when the measuring target is two-dimensional, the shape of (the section of) the workpiece can be almost exactly acquired, and it is possible to set an appropriate scanning path based on the acquired shape.

However, the scanning path might not be appropriately corrected by the autonomous correction process (ST300).

Thus, when the autonomous correction process (ST300) is performed, the number of the performances is counted, and the control loop (ST120 to ST300) may not be repeated more than a predetermined number of times.

The invention claimed is:

1. A method for controlling a shape measuring apparatus including a probe having a stylus tip at a tip, and a moving mechanism which moves the stylus tip scanning a surface of a workpiece, and configured to measure a shape of the workpiece by detecting contact between the stylus tip and the surface of the workpiece, the method comprising:

calculating a scanning path to move the stylus tip based on design data of the workpiece;

moving the stylus tip along the scanning path;

monitoring whether a distance between the scanning path and an actual workpiece is excessive;

generating a trajectory difference error when the distance between the scanning path and the actual workpiece is excessive;

performing, when the trajectory difference error is generated, geometric correction to the design data such that the design data approaches to the actual workpiece; and performing scanning measurement based on the design data after the geometric correction.

2. The method for controlling the shape measuring apparatus according to claim 1, wherein the geometric correction is one or more correction calculations selected from reduction, enlargement, rotation translation, and parallel translation.

3. The method for controlling the shape measuring apparatus according to claim 2, the method further comprising:

performing, when the trajectory difference error is generated, point measurement at a plurality of points of the workpiece; and determining a method of the geometric correction based on coordinates of the measurement points obtained by the point measurement.

4. The method for controlling the shape measuring apparatus according to claim 1, the method further comprising:

performing, when the trajectory difference error is generated again as a result of performing the scanning measurement based on the design data after the geometric correction, autonomous scanning measurement to the workpiece;

correcting the design data based on a measurement result obtained by the autonomous scanning measurement; and performing the scanning measurement based on the design data after the correction.

5. The method for controlling the shape measuring apparatus according to claim 1, the method further comprising:

determining, when the trajectory difference error is generated, whether a measuring target is two-dimensional; and performing, when the measuring target is two-dimensional, the geometric correction.

6. A non-volatile recording medium storing a program to cause a computer to execute a method for controlling a shape measuring apparatus according to claim 1.

* * * * *